United States Patent
Wu et al.

(10) Patent No.: US 8,248,789 B2
(45) Date of Patent: Aug. 21, 2012

(54) ELECTRONIC DEVICE

(75) Inventors: Wei Wu, Shenzhen (CN); Xin Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 323 days.

(21) Appl. No.: 12/770,780

(22) Filed: Apr. 30, 2010

(65) Prior Publication Data

US 2011/0148782 A1      Jun. 23, 2011

(30) Foreign Application Priority Data

Dec. 22, 2009   (CN) .......................... 2009 1 0312030

(51) Int. Cl.
   *G06F 1/16*   (2006.01)
   *G06F 3/02*   (2006.01)
   *H04M 1/00*   (2006.01)

(52) U.S. Cl. ......... 361/679.56; 361/679.55; 361/679.26; 361/679.27; 455/575.1; 455/575.3; 455/575.4; 345/168; 345/169; 345/905

(58) Field of Classification Search .. 361/679.01–679.3, 361/679.55–679.59; 455/575.1, 575.3, 575.4; 345/156, 157, 168, 169, 905
See application file for complete search history.

(56) References Cited

U.S. PATENT DOCUMENTS

| | | | | |
|---|---|---|---|---|
| 6,798,649 B1* | 9/2004 | Olodort et al. | ........... | 361/679.13 |
| 6,870,730 B2* | 3/2005 | Riddiford | ................ | 361/679.34 |
| 7,158,634 B2* | 1/2007 | Eromaki | .................. | 379/433.13 |
| 7,872,861 B2* | 1/2011 | Ou et al. | .................. | 361/679.27 |
| 7,924,554 B2* | 4/2011 | Shen | ......................... | 361/679.21 |
| 7,986,984 B2* | 7/2011 | Ou | .............................. | 455/575.4 |
| 8,077,854 B2* | 12/2011 | Ou et al. | ....................... | 379/330 |
| 8,081,449 B2* | 12/2011 | Lin et al. | .................. | 361/679.56 |
| 8,086,290 B2* | 12/2011 | Yoon et al. | ................. | 455/575.4 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

An electronic device includes a body, a cover, and a connecting mechanism. The body defines a guiding slot. A sliding post protrudes from the cover. The sliding post is slidably received in the guiding slot, whereby the cover is slidable and rotatable relative to the body. The connecting mechanism is slidably and rotatably coupled to the cover, and is further rotatably coupled to the body. When the sliding post slides along the guiding post to a predetermined position, the connecting mechanism rotates relative to the body, and further rotates and slides relative to the cover to support the cover, such that the cover is at an angle with the body.

19 Claims, 7 Drawing Sheets

US 8,248,789 B2

ELECTRONIC DEVICE

BACKGROUND

1. Technical Field

The disclosure generally relates to portable electronic devices.

2. Description of Related Art

Portable electronic devices, such as foldable phones, are in widespread use. Many foldable phones include a display, a touch screen, and a keypad. However, external operating modes of those foldable phones are confined to the following two options: phone closed with touch screen exposed, and phone open with keypad and the display exposed. This is a limitation. Therefore, there is room for improvement in the art.

BRIEF DESCRIPTION OF THE DRAWINGS

The components of the drawings are not necessarily drawn to scale, the emphasis instead being placed upon clearly illustrating the principles of the embodiments of an electronic device. Moreover, in the drawings, like reference numerals designate corresponding parts throughout several views.

DETAILED DESCRIPTION

Figure 1:
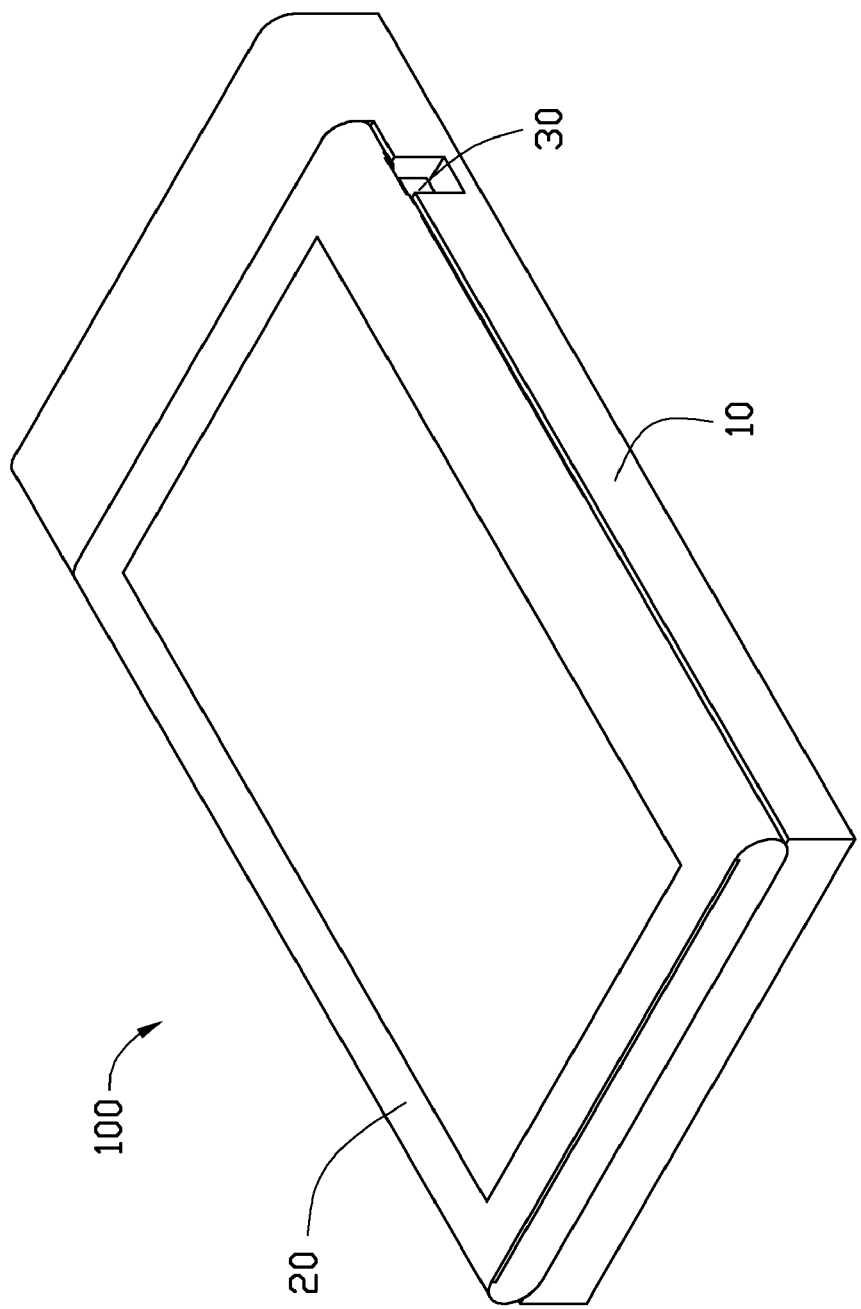
FIG. 1 is a perspective view of an electronic device being operated in a first of three modes in accordance with one embodiment.
Figure 2:
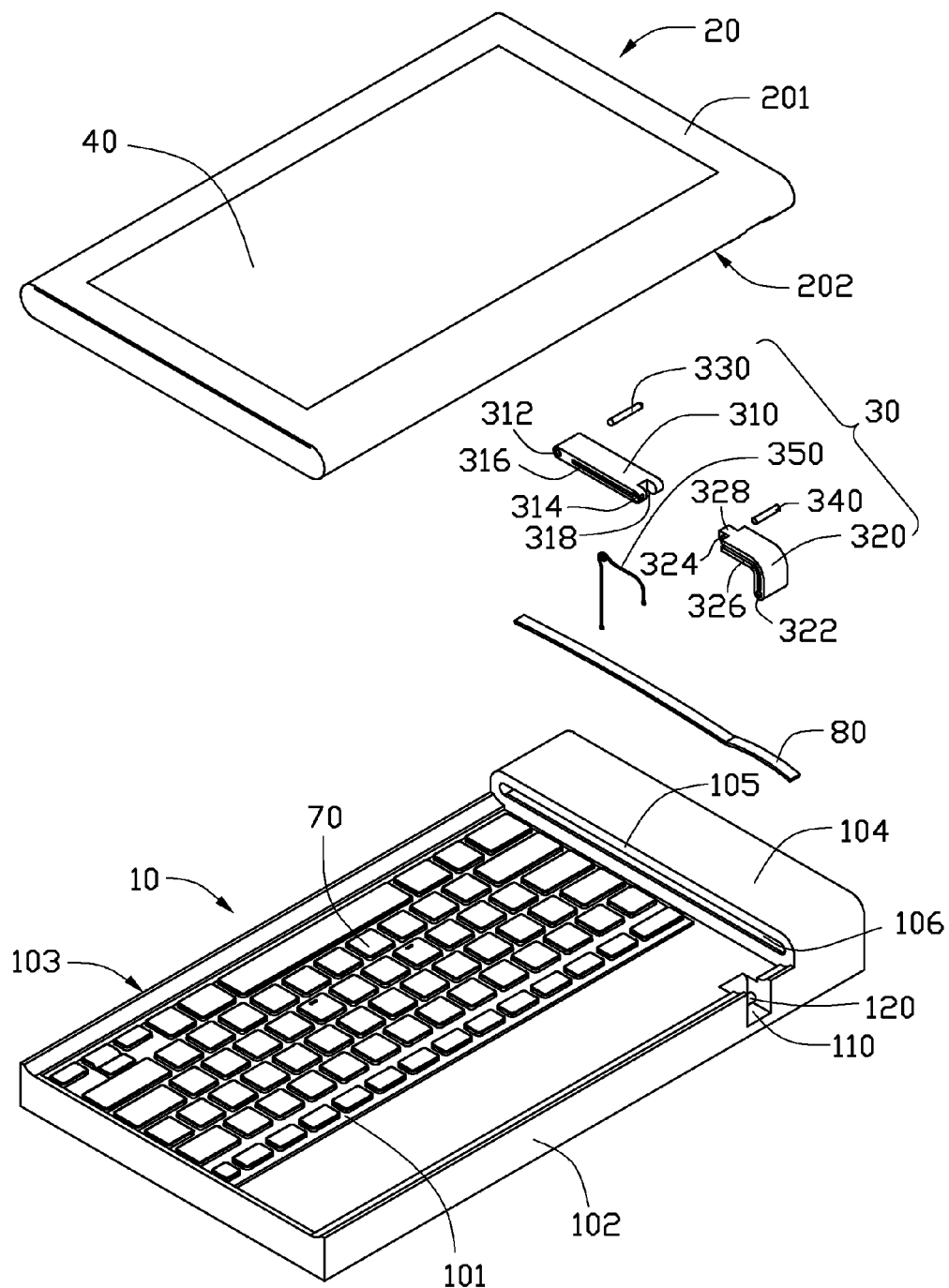
FIG. 2 is an exploded view of the electronic device of FIG. 1.
Figure 3:
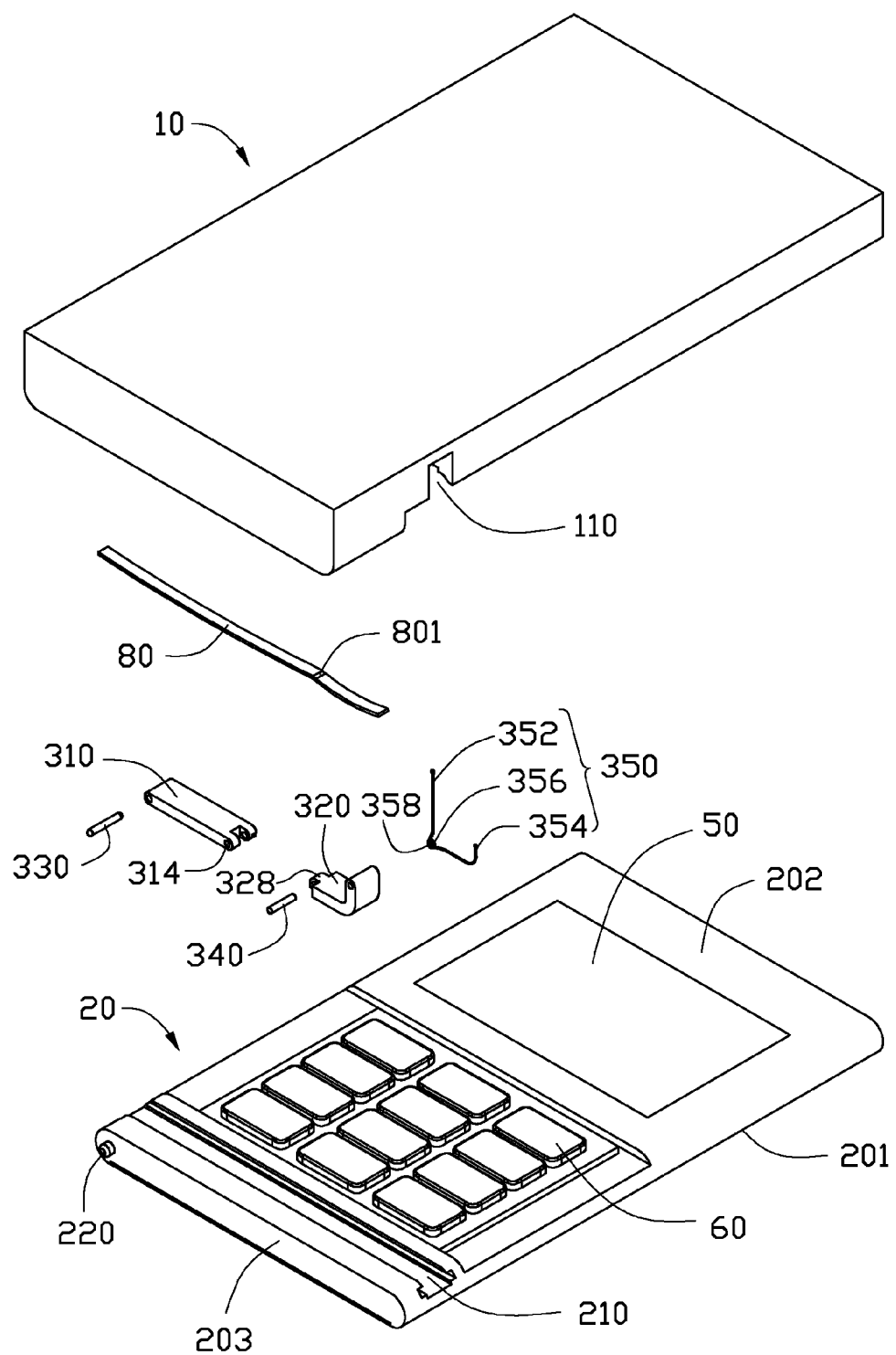
FIG. 3 is similar to FIG. 2, but viewed from another aspect.

Referring to FIGS. 1-3, an electronic device such as a foldable phone 100 is shown. The foldable phone 100 includes a body 10, a cover 20, and a connecting mechanism 30. The cover 20 is rotatably and slidably coupled to the body 10 via the connecting mechanism 30. The foldable phone 100 includes a first display 40, a second display 50, a first input device 70, and a second input device 60. The first and second displays 40, 50 are mounted to opposite surfaces of the cover 20 respectively. The first input device 70 is mounted to the body 10. The second input device 60 is mounted to a surface of the cover 20 having the second display 50. In the embodiment, the first display 40 is a touch screen. The first input device 70 is a computer type keyboard 70. The second input device 60 is a smart keypad 60 where one key is used for multiple characters.

Figure 5:
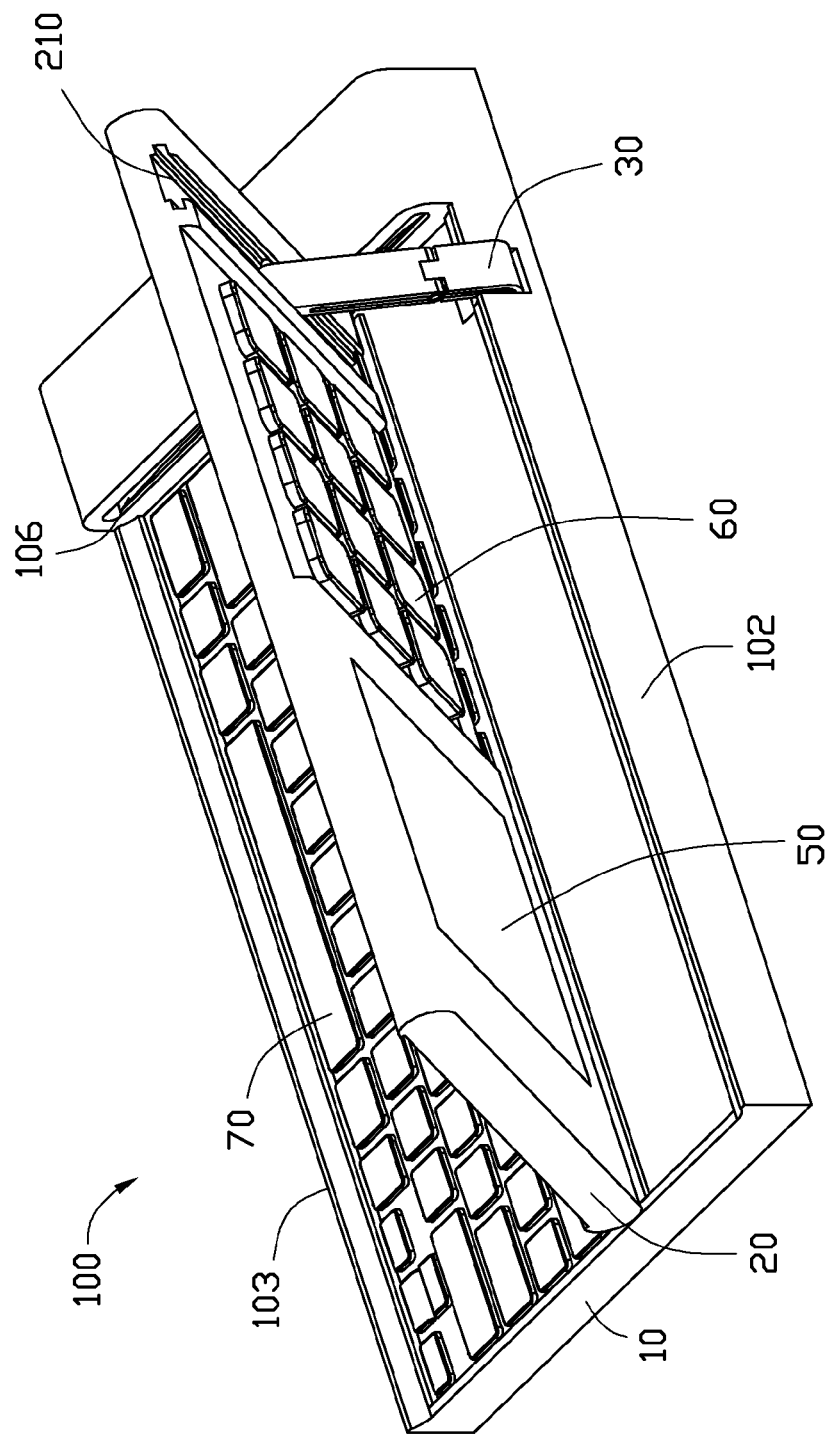
FIG. 5 is a perspective view of the electronic device of FIG. 1 being used in a second mode.
Figure 7:
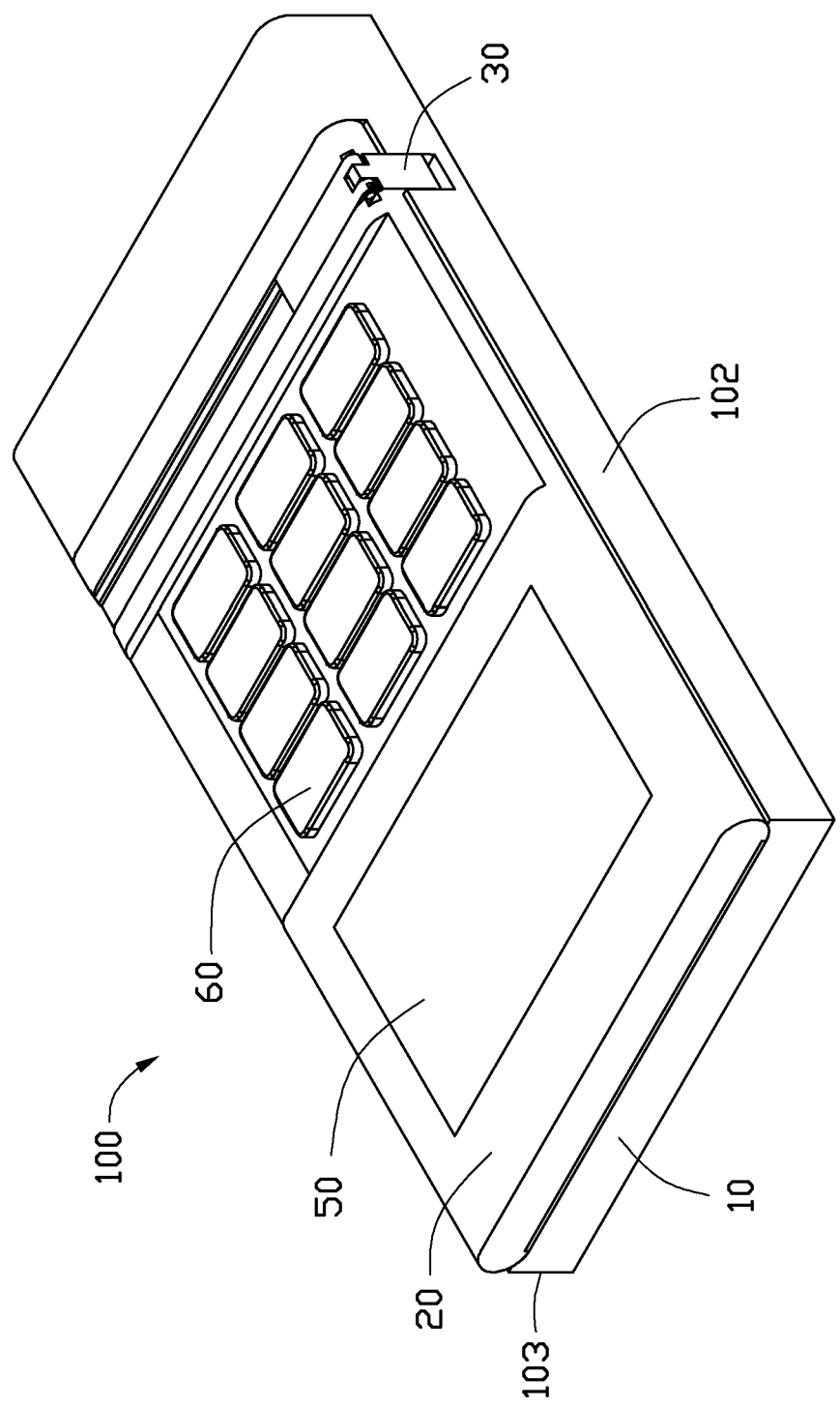
FIG. 7 is a perspective view of the electronic device of FIG. 1 being used in a third mode.

The foldable phone 100 is capable of being used in one of a first mode, a second mode, and a third mode. Referring to FIG. 1, when the foldable phone 100 is used in the first mode, the cover 20 is closed with the touch screen 40 exposed. Referring also to FIG. 5, when the foldable phone 100 is used in the second mode, the cover 20 is open with the touch screen 40 and the keyboard 70 exposed. Referring to FIG. 7, when the foldable phone 100 is used in the third mode, the cover 20 is closed with the second display 50 and the keypad 60 exposed.

The body 10 is substantially rectangular. The body 10 includes an upper surface 101, a first sidewall 102, and a second sidewall 103 opposite to the first sidewall 102. The first and second sidewalls 102, 103 are perpendicular to the upper surface 101, and are parallel to each other.

The keyboard 70 is arranged at the upper surface 101 and is adjacent to the second sidewall 103. A protruding block 104 protrudes from a rim of the upper surface 102. The protruding block 104 includes a first end surface 105. The first end surface 105 faces the keyboard 70. The first end surface 105 is perpendicular to the first and second sidewalls 102, 103, and the upper surface 101. The first end surface 105 defines a guiding slot 106. The guiding slot 106 extends in a direction perpendicular to the first and second sidewalls 102, 103, and extends from an end to the other end of the protruding block 104. The first sidewall 102 defines an opening 110. The opening 110 extends through the upper surface 101. In the embodiment, the opening 110 is adjacent to the protruding block 104. In other embodiments, the opening 110 can be defined at the other end of the first sidewall 102 opposite to the protruding block 104. A pivot rod 120 is mounted in the opening 110, and is perpendicular to the first end surface 105.

The cover 20 is substantially rectangular. The cover 20 includes an outer surface 201, an inner surface 202 opposite to the outer surface 201, and opposite second end surfaces 203. The touch screen 40 is mounted on the outer surface 201. The second display 50 and the keypad 60 are mounted at the inner surface 202. In the embodiment, the touch screen 40 is larger than the second display 50.

An end of the inner surface 202 defines a sliding slot 210 corresponding to the opening 110. In the embodiment, the sliding slot 210 is arranged between the keypad 60 and one of the second end surfaces 203 adjacent to the keypad 60. The sliding slot 210 includes a wide portion (not labeled) and a narrow portion (not labeled). The wide portion communicates with the narrow portion. A cylindrical post 220 protrudes from the second end surface 203 adjacent to the sliding slot 210. The cylindrical post 220 is slidably received in the guiding slot 106, such that the cover 20 is slidable and rotatable relative to the body 10.

The foldable phone 100 further includes an elastic sheet 80. The elastic sheet 80 is received in the guiding slot 106. The elastic sheet 80 is curved to form a curved portion (not shown). The curved portion defines a groove 801. The cylindrical post 220 can be driven to slide into the groove 801.

The connecting mechanism 30 includes a connecting member 310, a pivoting member 320, a guiding post 330, a shaft 340, and an elastic element 350. The guiding post 330 is fixed to an end of the connecting member 310. The guiding post 330 is slidably received in the wide portion of the sliding slot 210. The pivoting member 320 is pivotably and elastically coupled to the other end of the connecting member 310 opposite to the guiding post 330 via the shaft 340 cooperating with the elastic element 350. The pivoting member 320 is pivotably coupled to the body 10 via the pivot rod 120.

The connecting member 310 is substantially rectangular. A first and two second through holes 312, 314 are defined at opposite ends of the connecting member 310 respectively. The first through hole 312 is configured to receive the guiding post 330. The two second through holes 314 are configured to receive the shaft 340, such that the pivoting member 320 is pivotably coupled to the connecting member 310. A sidewall surface of the connecting member 310 defines a first receiving slot 316. An end of the connecting member 310 defines a concave portion 318. The concave portion 318 is disposed between the second through holes 314.

The pivoting member 320 is substantially L-shaped. A protruding block 328 protrudes from an end of the pivoting member 320. The protruding block 328 is received in the concave portion 318. The protruding block 328 defines a third through hole 324. The other end of the pivoting member 320 opposite the protruding block 328 define a fourth through hole 322. A sidewall surface of the pivoting member 320 defines a second receiving slot 326. Two ends of the elastic element 350 are received in the first and second receiving slot 316, 326 respectively.

The elastic element 350 is substantially V-shaped. In the embodiment, the elastic element 350 is a torsion spring. The elastic element 350 includes a first arm 352, a second arm 354, and a connecting portion 356 for connecting the first arm 352 with the second arm 354. The connecting portion 356 defines a round hole 358. The first and second arms 352, 354 are received in the first and second receiving slot 316, 326 respectively.

Figure 4:
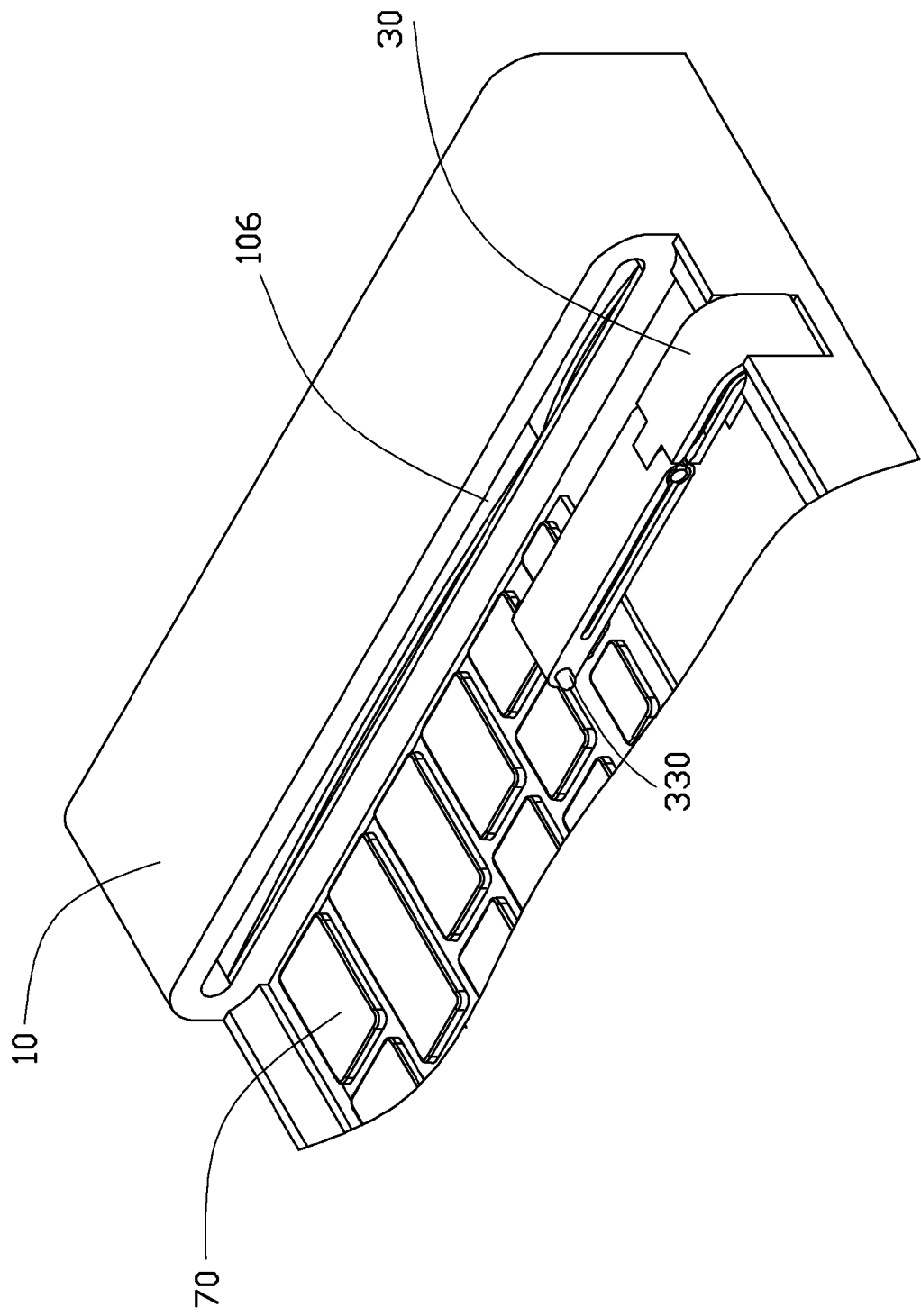
FIG. 4 is a partial assembled view.

Referring to FIG. 4, in assembly, the elastic sheet 80 is received in the guiding slot 106. The pivoting member 320 is pivotably coupled to the body 10 by inserting the pivot rod 120 into the fourth through hole 322. The shaft 340 is inserted into the second and third through hole 314, 324, and the round hole 358 in the same order as mentioned here, and the first and second arms 352, 354 of the elastic element 350 are received in the first and second receiving slot 316, 326 respectively, such that the connecting member 310 is pivotably and elastically coupled to the pivoting member 320.

Figure 6:
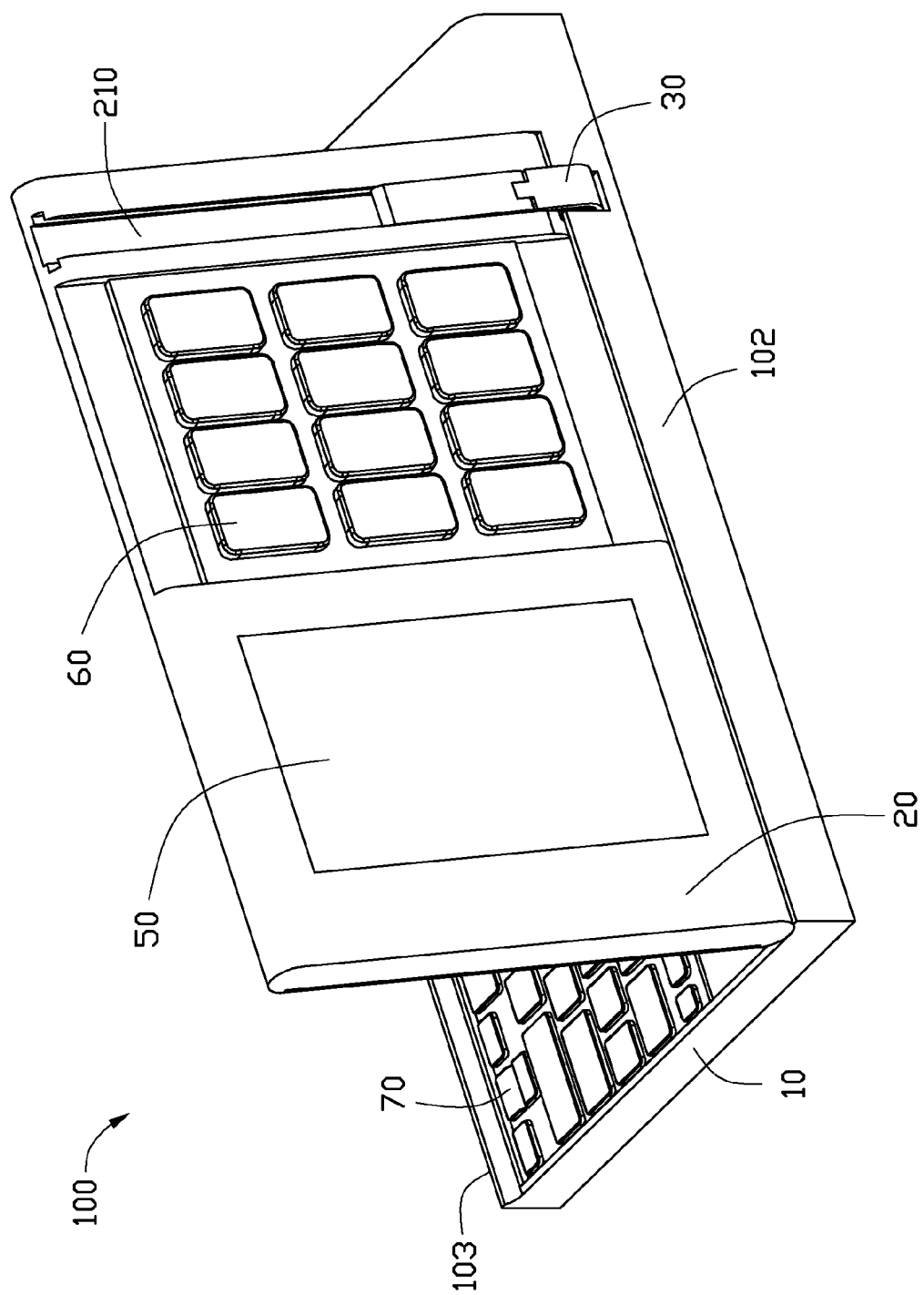
FIG. 6 is similar to FIG. 5, but showing the electronic device in another state while still in the second mode.

Referring also to FIGS. 5-6, the cylindrical post 220 is received in the guiding slot 106. The guiding post 330 inserts through the first through hole 312, and is further slidably received in the wide portion of the sliding slot 210. Therefore, the cover 20 is slidably and rotatably coupled to the body 10.

Referring back to FIG. 1, when the foldable phone 100 is not in use, the cover 20 is closed with the touch screen 40 exposed, and the foldable phone 100 is available for use in the first mode. In the first mode, the touch screen 40 is operated as an input device to receive touch inputs and also as an output device to display information.

Referring back to FIG. 5, when the cover 20 is driven to slide in a direction from the second sidewall 103 to the first sidewall 102, the connecting mechanism 30 rotates relative to the body 10, and the guiding post 330 slides along the sliding slot 210. As a result, the cover 20 is supported by the connecting mechanism 30 and is angled with the body 10. When the cylindrical post 220 slides along the guiding slot 106 to be located in the groove 801, the cover 20 is located and is angled with the body 10 in a desired angle. Thus, the cover 20 is open with the touch screen 40 and keyboard 70 exposed, and the foldable phone 100 can be used in the second mode. In the second mode, the keyboard 70 is operated as an input device to receive user inputs, and the touch screen 40 is operated as an output device to display information.

Referring to FIG. 6, when the cylindrical post 220 slides away from the groove 801 and arrive at an end of the guiding slot 106 adjacent to the first sidewall 102, the cover 20 is perpendicular to the body 10, and the connecting member 310 is substantially received in the guiding slot 106. Referring also to FIG. 7, when the cover 20 is further rotated toward the keyboard 70, the cover 20 covers on the body 10 again with the second display 50 and the keypad 60 exposed. Thus, the foldable phone 100 can be used in the third mode, the keypad 60 is operated to receive user input operations, and the second display 50 is operated as an output device to display information.

Therefore, by operating the cover 20, the foldable phone 100 is selectable to be used in one of the first, second, and third modes.

Furthermore, two magnetic elements (not shown) are fixed to the body 10 and the cover 20 respectively. When the foldable phone 100 is used in the first and third modes, the two magnetic elements attract each other, such that the cover 20 stays securely in place on the body 10.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device, comprising: a body defining a guiding slot; a cover comprising a sliding post; and a connecting mechanism; wherein the sliding post is slidably received in the guiding slot, whereby the cover is slidable and rotatable relative to the body, the connecting mechanism is slidably and rotatably coupled to the cover, and is further rotatably coupled to the body, when the sliding post slides along the guiding slot to a predetermined position, the connecting mechanism rotates relative to the body, and further rotates and slides relative to the cover to support the cover, such that the cover is at an angle with the body; the electronic device further comprising an elastic sheet, the elastic sheet received in the guiding slot, the elastic sheet defining a groove, the sliding post located at the groove when the sliding post slides along the guiding slot into the groove.

2. The electronic device of claim 1, wherein a protruding block protrudes from a rim of the body, the protruding block defines the guiding slot.

3. The electronic device of claim 2, wherein the body comprises an upper surface, a first sidewall, and a second sidewall opposite to the first sidewall, the first and second sidewalls are perpendicular to the upper surface, and are parallel to each other, the protruding block protrudes from an end of the upper surface, the guiding slot extends in a direction perpendicular to the first and second sidewalls.

4. The electronic device of claim 3, further comprising a first input device, wherein the first input device is mounted on the upper surface and faces the guiding slot.

5. The electronic device of claim 1, further comprising a first display, a second display, and a second input device, the first display fixed to an outer surface of the cover, the second display and the second input device fixed to an inner surface of the cover opposite to the outer surface.

6. The electronic device of claim 5, wherein the size of the first display is larger than that of the second display.

7. The electronic device of claim 6, wherein the first display is a touch screen.

8. The electronic device of claim 5, wherein the inner surface of the cover defines a sliding slot, the connecting mechanism is pivotably and slidably coupled to the cover via the sliding slot.

9. The electronic device of claim 8, wherein the connecting mechanism comprises a connecting member, a pivoting member, and a guiding post, the guiding post is fixed to an end of the connecting member, and is further pivotably and slidably received in the sliding slot, the pivoting member is rotatably coupled to the other end of the connecting member, and the pivoting member is further rotatably coupled to the body.

10. The electronic device of claim 9, wherein the connecting member further comprises an elastic element, the connecting member and the pivoting member are coupled to opposite ends of the elastic element respectively.

11. The electronic device of claim 10, wherein the elastic element is V-shaped.

12. An electronic device capable of being used in one of a first mode, a second mode, and a third mode, the electronic device comprising: a first electronic member comprising an upper surface and opposite sidewalls perpendicular to the upper surface, the upper surface defining a guiding slot extending in a direction perpendicular to the opposite sidewalls; a second electronic member comprising a sliding post, the sliding post is slidably received in the guiding slot, whereby the second electronic member is rotatably and slidably coupled to the first electronic member, the second electronic member capable of being changed between a closed state and an open state and the second electronic member comprising a first display surface and a second display surface; and a connecting mechanism pivotably coupled to the first electronic member, and further rotatably and slidably coupled to the second electronic member, the connecting mechanism being configured for allowing the second electronic member to be changed between the closed state and the open state; wherein when the second electronic member is in the closed state, the second electronic member covers the body with one of the first display surface and the second display surface being exposed, and the electronic device is used in the first and third modes, and when the second electronic member is in the open state, the second electronic member is capable of being driven to slide along the guiding slot and is supported by the connecting mechanism to be at an angle with the first electronic member, the first display surface is exposed, and the electronic device is used in the second mode; the electronic device further comprising an elastic sheet, the elastic sheet received in the guiding slot, the elastic sheet defining a groove, the sliding post located at the groove when the sliding post slides along the guiding slot into the groove.

13. The electronic device of claim 12, further comprising a first display, a second display, a first input device, and a second input device, the first display fixed to the first display surface, the second display fixed to the second display surface, the first input device fixed to the upper surface, and the second input device fixed to the second display surface.

14. The electronic device of claim 13, wherein a size of the first display is larger than that of the second display surface.

15. The electronic device of claim 14, wherein the first display is a touch screen.

16. The electronic device of claim 13, wherein the second display surface defines a sliding slot, an end of the connecting mechanism is rotatably and slidably received in the sliding slot, whereby the connecting mechanism is rotatably and slidably coupled to the second electronic member.

17. An electronic device, comprising: a first electronic member comprising an upper surface, the upper surface defining a guiding slot; a second electronic member comprising a sliding post, the sliding post is slidably received in the guiding slot, whereby the second electronic member is rotatably and slidably coupled to the first electronic member via the guiding slot, the second electronic member comprising a first display surface and a second display surface, the second electronic member capable of being changed between a closed state and an open state; and a connecting mechanism pivotably coupled to the first electronic member, and further rotatably and slidably coupled to the second electronic member, when the second electronic member is in the closed state, the connecting mechanism being configured for allowing the electronic device to be changed between a first mode and a second mode; wherein when the electronic device is in the first mode, the second electronic member covers the upper surface of the first electronic member with the first display surface exposed, and when the electronic device is in the second mode, the second electronic member covers the upper surface of the first electronic member with the second display surface exposed; the electronic device further comprising an elastic sheet, the elastic sheet received in the guiding slot, the elastic sheet defining a groove, the sliding post located at the groove when the sliding post slides along the guiding slot into the groove.

18. The electronic device of claim 17, wherein when the second electronic member is in the open state, the second electronic member is capable of being driven to slide along the guiding slot, and the connecting mechanism supports the second electronic member to be at an angle with the first electronic member, and the upper surface and the first display surface are exposed.

19. The electronic device of claim 17, further comprising a first display, a second display, a first input device, and a second input device, the first display fixed to the first display surface, the second display fixed to the second display surface, the first input device fixed to the upper surface, and the second input device fixed to the second display surface.

\* \* \* \* \*